US009137604B2

(12) United States Patent
Sunaga et al.

(10) Patent No.: US 9,137,604 B2
(45) Date of Patent: Sep. 15, 2015

(54) AUDIO PROCESSING APPARATUS

(71) Applicant: Onkyo Corporation, Osaka (JP)

(72) Inventors: Tadaharu Sunaga, Osaka (JP); Susumu Koaze, Osaka (JP)

(73) Assignee: Onkyo Corporations, Neyagawa-shi (JP)

( * ) Notice: Subject to any disclaimer, the term of this patent is extended or adjusted under 35 U.S.C. 154(b) by 354 days.

(21) Appl. No.: 13/751,393

(22) Filed: Jan. 28, 2013

(65) Prior Publication Data

US 2013/0202115 A1 Aug. 8, 2013

(30) Foreign Application Priority Data

Feb. 6, 2012 (JP) .................................. 2012-23528

(51) Int. Cl.

| | |
|---|---|
| ***H02B 1/00*** | (2006.01) |
| ***H04R 5/00*** | (2006.01) |
| ***H04R 5/02*** | (2006.01) |
| ***H04R 5/04*** | (2006.01) |
| ***H04S 3/00*** | (2006.01) |
| ***H04S 7/00*** | (2006.01) |

(52) U.S. Cl.

CPC .. *H04R 5/00* (2013.01); *H04R 5/04* (2013.01); *H04S 3/00* (2013.01); *H04S 7/30* (2013.01); *H04R 2420/01* (2013.01); *H04R 2420/03* (2013.01)

(58) Field of Classification Search

None

See application file for complete search history.

(56) References Cited

U.S. PATENT DOCUMENTS

| | | | | |
|---|---|---|---|---|
| 4,953,213 | A | 8/1990 | Tasaki et al. | |
| 7,813,824 | B2 * | 10/2010 | Takahama | 700/94 |
| 7,978,865 | B2 | 7/2011 | Sunaga et al. | |
| 2004/0264717 | A1 * | 12/2004 | Fujita et al. | 381/307 |
| 2011/0243334 | A1 | 10/2011 | Misaki et al. | |
| 2012/0183147 | A1 * | 7/2012 | Sunaga | 381/17 |

FOREIGN PATENT DOCUMENTS

| | | |
|---|---|---|
| EP | 2375789 A2 | 10/2011 |
| JP | 2010-183203 | 8/2010 |
| JP | 2011-229113 | 11/2011 |

* cited by examiner

*Primary Examiner* — Andrew L Sniezek

(74) *Attorney, Agent, or Firm* — Renner, Otto, Boisselle & Sklar, LLP

(57) ABSTRACT

A pre-out terminal that outputs the audio signal is fixed. One of a surround back left audio signal SBL, a left outside audio signal LW, and a left upside audio signal LH is selected by a user operation, and output to a pre-out terminal 11*c*. A determination which one of two signals except the pre-out terminal in the signals SBL, LW, and LH is included in multichannel audio data is made. When it is determined that the signal SBL is included, the signal SBL amplified by an amplifier 12*a* is supplied to an SBL speaker terminal 14*a*. When it is determined that the signal LW is included, the signal LW amplified by the amplifier 12*a* is supplied to an LW speaker terminal 14*b*. When it is determined that the signal LH is included, the signal LH amplified by the amplifier 12*a* is supplied to an LH speaker terminal 14*c*.

2 Claims, 9 Drawing Sheets

AUDIO PROCESSING APPARATUS

BACKGROUND OF THE INVENTION

1. Field of the Invention

The present invention relates to an audio processing apparatus that plays back multichannel audio data.

2. Description of the Related Art

An audio playback system including a BD (Blue-ray disc) player, an AV amplifier, and a display device is used. Audio data transmitted from the BD player to the AV amplifier is generated by encoding multichannel audio data. For example, as illustrated in FIG. 3, the multichannel audio data includes a left audio signal L, a right audio signal R, a central audio signal C, a low-frequency audio signal SW, a surround left audio signal SL, and a surround right audio signal SR. Recently HD (High Definition) -related audio formats, such as Dolby True HD, Dolby Digital Plus, and DTS-HD, which are used in a BD player, appear on the scene. A surround back left audio signal SBL, a surround back right audio signal SBR, a left outside audio signal LW, a right outside audio signal RW, a left upside audio signal LH, and a right upside audio signal RH are further added in the HD-related audio formats.

However, when amplifiers corresponding to the audio signals of all the channels are provided in the AV amplifier, it is necessary to provide the amplifiers for the total of 11.1 channels, which results in a problem in that a cost increases significantly. The same holds true for the case that, as illustrated in FIG. 7, a left-central-side audio signal LC and a right-central-side audio signal RC are added instead of any one of the extended channels (or in addition to the extended channels). The same also holds true for the case that the AV amplifier generates the extended channels in a DSP according to a listening mode.

An audio processing apparatus in FIG. 9 is conceivable for the purpose of solving the problem. According to the audio processing apparatus, in the case that the surround back left audio signal SBL and the left upside audio signal LH are included, the surround back left audio signal SBL is supplied from a DAC 511*a* to an amplifier 512*a*, and the left upside audio signal LH is supplied from a DAC 511*b* to an amplifier 512*b*. Switches S513*a* and S513*d* are controlled in the on state, and switches S513*b* and S513*c* are controlled in the off state. Therefore, the surround back left audio signal SBL amplified by the amplifier 512*a* is supplied to a surround back left SP terminal 514*a*, and the left upside audio signal LH amplified by the amplifier 512*b* is supplied to a left upside SP terminal 514*c* (see Japanese Unexamined Patent Publication Nos. 2011-229113 and 2010-183203).

In the case that the surround back left audio signal SBL and the left outside audio signal LW are included, the surround back left audio signal SBL is supplied from the DAC 511*a* to the amplifier 512*a*, and the left outside audio signal LW is supplied from the DAC 511*b* to the amplifier 512*b*. The switches S513*a* and S513*c* are controlled in the on state, and switches S513*b* and S513*d* are controlled in the off state. Therefore, the surround back left audio signal SBL amplified by the amplifier 512*a* is supplied to the surround back left SP terminal 514*a*, and the left outside audio signal LW amplified by the amplifier 512*b* is supplied to a left outside SP terminal 514*b*. The left outside audio signal LW is also output from a pre-out terminal 511*d*. Accordingly, another amplifier device is connected to the pre-out terminal 511*d*, and the left outside audio signal LW amplified by another amplifier device can also be played back.

In the case that the left outside audio signal LW and the left upside audio signal LH are included, the left outside audio signal LW is supplied from the DAC 511*a* to the amplifier 512*a*, and the left upside audio signal LH is supplied from the DAC 511*b* to the amplifier 512*b*. The switches S513*b* and S513*d* are controlled in the on state, and the switches S513*a* and S513*c* are controlled in the off state. Therefore, the left outside audio signal LW amplified by the amplifier 512*a* is supplied to the left outside SP terminal 514*b*, and the left upside audio signal LH amplified by the amplifier 512*b* is supplied to the left upside SP terminal 514*c*. The left outside audio signal LW is also output from a pre-out terminal 511*c*. Accordingly, another amplifier device is connected to the pre-out terminal 511*c*, and the left outside audio signal LW amplified by another amplifier device can also be played back.

At this point, according to the audio processing apparatus, unfortunately the pre-out terminal that outputs the left outside audio signal LW varies depending on the case that the surround back left audio signal SBL and the left outside audio signal LW are included and the case that the left outside audio signal LW and the left upside audio signal LH are included. That is, it is necessary to change an input terminal of another amplifier, which is connected to the pre-out terminal, according to a combination of channels included in the multichannel audio data.

SUMMARY OF THE INVENTION

The present invention is devised in order to solve the above conventional problems, and its object is to provide an audio processing apparatus, in which the pre-out terminal that outputs the extended left audio signal (or the extended right audio signal) can be fixed.

An audio processing apparatus according to a preferred embodiment of the present invention comprising: an amplifier that amplifies a first extended left audio signal (or a first extended right audio signal), a second extended left audio signal (or a second extended right audio signal), or a third extended left audio signal (or a third extended right audio signal); a first speaker terminal that outputs the first extended left audio signal; a second speaker terminal that outputs the second extended left audio signal; a third speaker terminal that outputs the third extended left audio signal; a pre-out terminal that outputs one of the first extended left audio signal, the second extended left audio signal, and the third extended left audio signal, which are set by a pre-out setting unit; a first switch that switches whether the first extended left audio signal is supplied from the amplifier to the first speaker terminal; a second switch that switches whether the second extended left audio signal is supplied from the amplifier to the second speaker terminal; a third switch that switches whether the third extended left audio signal is supplied from the amplifier to the third speaker terminal; the pre-out setting unit that selects and sets one of the first extended left audio signal, the second extended left audio signal, and the third extended left audio signal by a user operation, and outputs the selected audio signal to the pre-out terminal; a channel determination unit that determines which one of two audio signals except the audio signal set by the pre-out setting unit in the first extended left audio signal, the second extended left audio signal, and the third extended left audio signal is included in multichannel audio data; and a switching controller that causes the first switch to supply the first extended left audio signal amplified by the amplifier to the first speaker terminal when determining that the first extended left audio signal is included in the multichannel audio data, the switching controller causing the second switch to supply the second extended left audio signal amplified by the amplifier to the second speaker terminal when determining that the second extended left audio signal is included in the multichannel audio data, the switching controller causing the third switch to supply the third extended left audio signal amplified by the amplifier to the third speaker terminal when determining that the third extended left audio signal is included in the multichannel audio data.

When the first extended left audio signal is set by the pre-out setting unit, the first extended left audio signal is output from the pre-out terminal. At this point, when the multichannel audio data includes the second extended left audio signal, the second extended left audio signal amplified by the amplifier is supplied to the second speaker terminal through the second switch. On the other hand, when the multichannel audio data includes the third extended left audio signal, the third extended left audio signal amplified by the amplifier is supplied to the third speaker terminal through the third switch.

When the second extended left audio signal is set by the pre-out setting unit, the second extended left audio signal is output from the pre-out terminal. At this point, when the multichannel audio data includes the first extended left audio signal, the first extended left audio signal amplified by the amplifier is supplied to the first speaker terminal through the first switch. On the other hand, when the multichannel audio data includes the third extended left audio signal, the third extended left audio signal amplified by the amplifier is supplied to the third speaker terminal through the third switch.

When the third extended left audio signal is set by the pre-out setting unit, the third extended left audio signal is output from the pre-out terminal. At this point, when the multichannel audio data includes the first extended left audio signal, the first extended left audio signal amplified by the amplifier is supplied to the first speaker terminal through the first switch. On the other hand, when the multichannel audio data includes the second extended left audio signal, the second extended left audio signal amplified by the amplifier is supplied to the second speaker terminal through the second switch.

As described above, according to the embodiment, one of the first extended left audio signal, the second extended left audio signal, and the third extended left audio signal is set by the user operation and output from the pre-out terminal, so that the pre-out terminal that outputs the audio signal can be fixed.

In a preferred embodiment, the first extended left audio signal is any one of a surround back left audio signal, a left outside audio signal, a left upside audio signal, and a left-central-side audio signal (or the first extended right audio signal is any one of a surround back right audio signal, a right outside audio signal, a right upside audio signal, and a right-central-side audio signal), the second extended left audio signal is any one of the surround back left audio signal, the left outside audio signal, the left upside audio signal, and the left-central-side audio signal and is different from the first extended left audio signal (or the second extended right audio signal is anyone of the surround back right audio signal, the right outside audio signal, the right upside audio signal, and the right-central-side audio signal and different from the first extended right audio signal), and the third extended left audio signal is any one of the surround back left audio signal, the left outside audio signal, the left upside audio signal, and the left-central-side audio signal and different from the first extended left audio signal and the second extended left audio signal (or the third extended right audio signal is any one of the surround back right audio signal, the right outside audio signal, the right upside audio signal, and the right-central-side audio signal and different from the first extended right audio signal and the second extended right audio signal).

Accordingly, the present invention can provide the audio processing apparatus, in which the pre-out terminal that outputs the extended left audio signal (or the extended right audio signal) can be fixed.

DETAILED DESCRIPTION OF THE PREFERRED EMBODIMENTS

Figure 1:
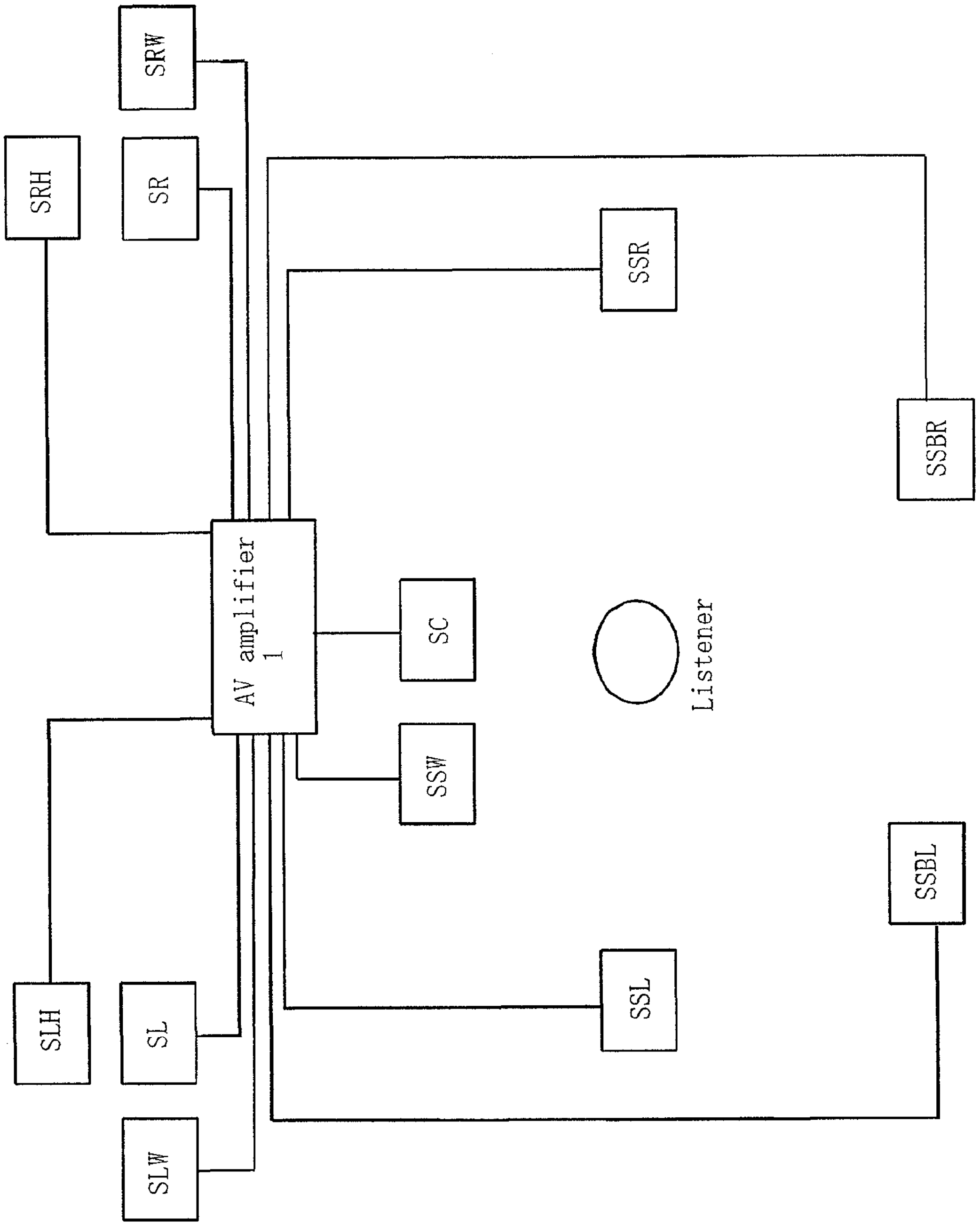
FIG. 1 is a view illustrating dispositions of an AV amplifier and speakers.

Hereinafter, an audio playback system including a disk playback apparatus (hereinafter referred to as a BD player), an audio processing apparatus (hereinafter referred to as an AV amplifier), and a display device according to preferred embodiments of the present invention will specifically be described with reference to the drawings. However, the present invention is not limited to the embodiments. FIG. 1 is a view illustrating an example of dispositions of an AV amplifier 1 and speakers according to a first embodiment. A left speaker SL, a right speaker SR, a central speaker SC, a low-frequency speaker SSW, a surround left speaker SSL, a surround right speaker SSR, a surround back left speaker SSBL, a surround back right speaker SSBR, a left upside speaker SLH, a right upside speaker SRH, a left outside speaker SLW, and a right outside speaker SRW are connected to the AV amplifier 1.

Figure 2:
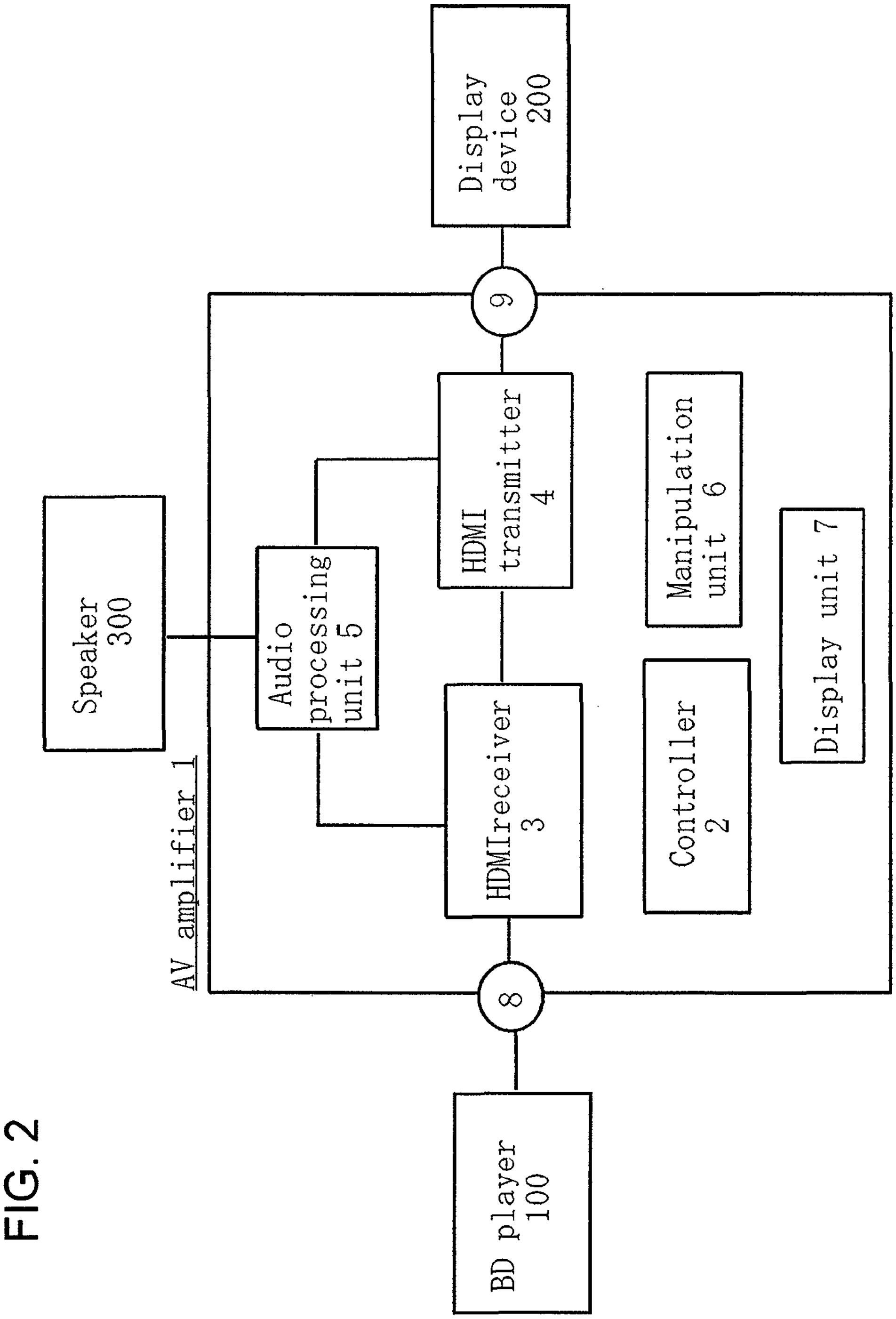
FIG. 2 is a view illustrating an audio playback system.

FIG. 2 is a block diagram illustrating a configuration of an audio playback system. For example, a BD player 100, the AV amplifier 1, and a display device 200 are compliant with an HDMI standard, and are connected to one another through an HDMI cable. The BD player 100 transmits HDMI data including multichannel audio data and video data to the AV amplifier 1. The AV amplifier 1 amplifies the multichannel audio data, which is received from the BD player 100 and included in the HDMI data, and outputs the multichannel audio data to the speakers. The AV amplifier 1 transmits the HDMI data including the video data to the display device 200. The display device 200 displays the video data, which is received from the AV amplifier 1 and included in the HDMI data.

The AV amplifier 1 includes a controller 2, an HDMI receiver 3, an HDMI transmitter 4, an audio processing unit 5, a manipulation unit 6, a display unit 7, and HDMI terminals 8 and 9. A speaker 300 (corresponding to each speaker in FIG. 1) is connected to the AV amplifier 1.

The HDMI receiver 3 receives the HDMI data transmitted from the BD player 100, generates original video data from the received HDMI data, and supplies the original video data to the HDMI transmitter 4. The HDMI receiver 3 generates original multichannel audio data from the received HDMI data, and supplies the original multichannel audio data to the audio processing unit 5.

Figure 3:
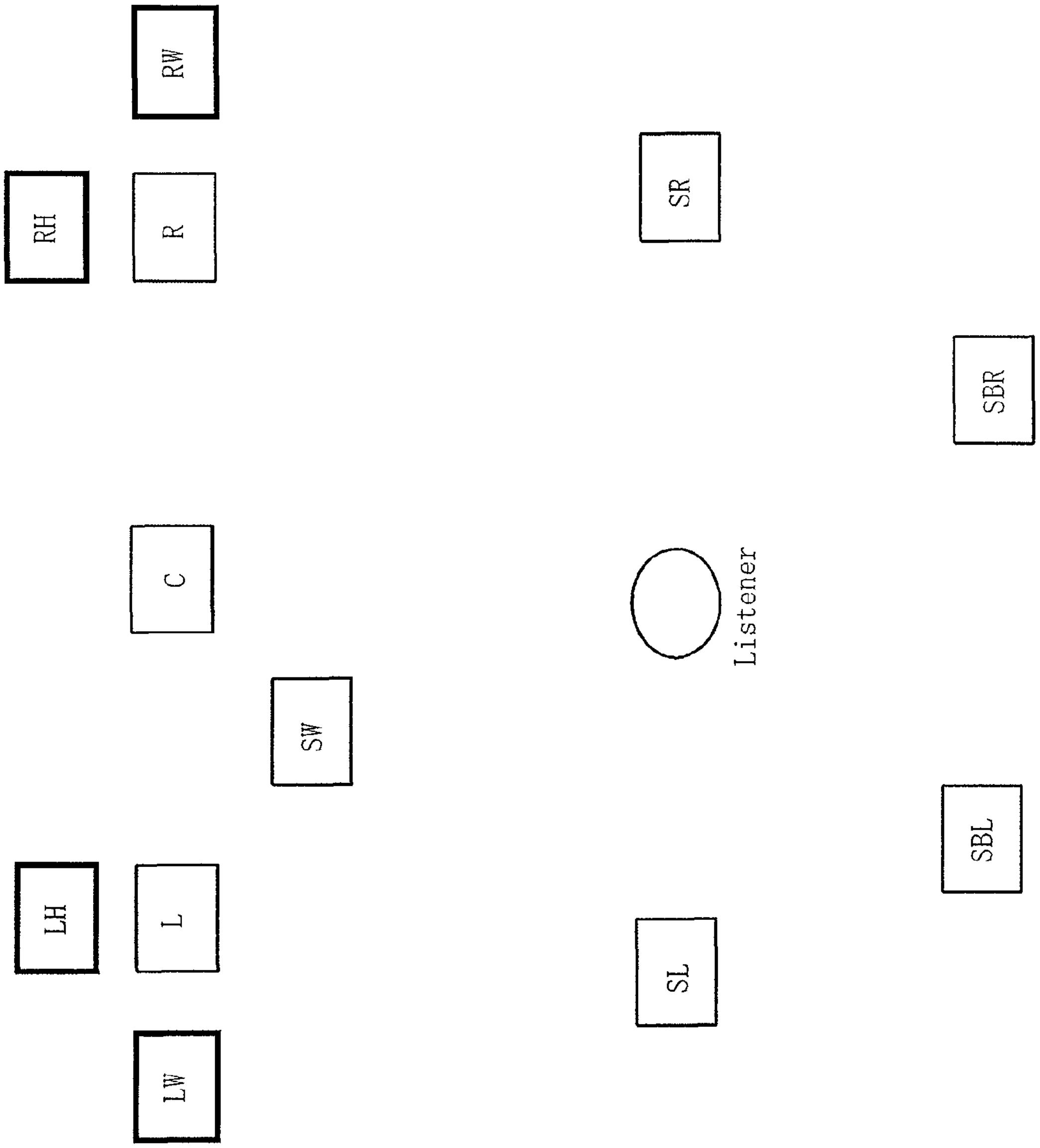
FIG. 3 is a view illustrating channels of audio signals.

The audio processing unit 5 decodes the multichannel audio data supplied from the HDMI receiver 3, performs pieces of processing, such as acoustic processing, D/A conversion processing, a volume adjusting processing, and amplifying processing, and supplies an audio signal of each channel to the speaker 300. The multichannel audio data supplied to the audio processing unit 5 will be described. As illustrated in FIG. 3, for example, HD (High Definition) -related audio formats, such as Dolby True HD, Dolby Digital Plus, and DTS-HD include a left audio signal L (front left audio signal), a right audio signal R (front right audio signal), a central audio signal C, a low-frequency audio signal SW, a surround left audio signal SL, a surround right audio signal SR, a surround back left audio signal SBL, a surround back right audio signal SBR, a left outside audio signal LW, a right outside audio signal RW, an left upside audio signal LH, and an right upside audio signal RH.

The surround back left audio signal SBL is played back from a position on a back left side of a user. The surround back right audio signal SBR is played back from a position on a back right side of the user. The left outside audio signal LW is played back from a position (that is, on a front left outside of the user) of an outside (a left side) of the left audio signal L. The right outside audio signal RW is played back from a position (that is, on a front right outside of the user) of an outside (a right side) of the right audio signal R. The left upside audio signal LH is played back from a position (that is, on a front left upside of the user) of an upside of the left audio signal L. The right upside audio signal RH is played back from a position (that is, on a front right upside of the user) of the upside of the right audio signal R.

Figure 4:
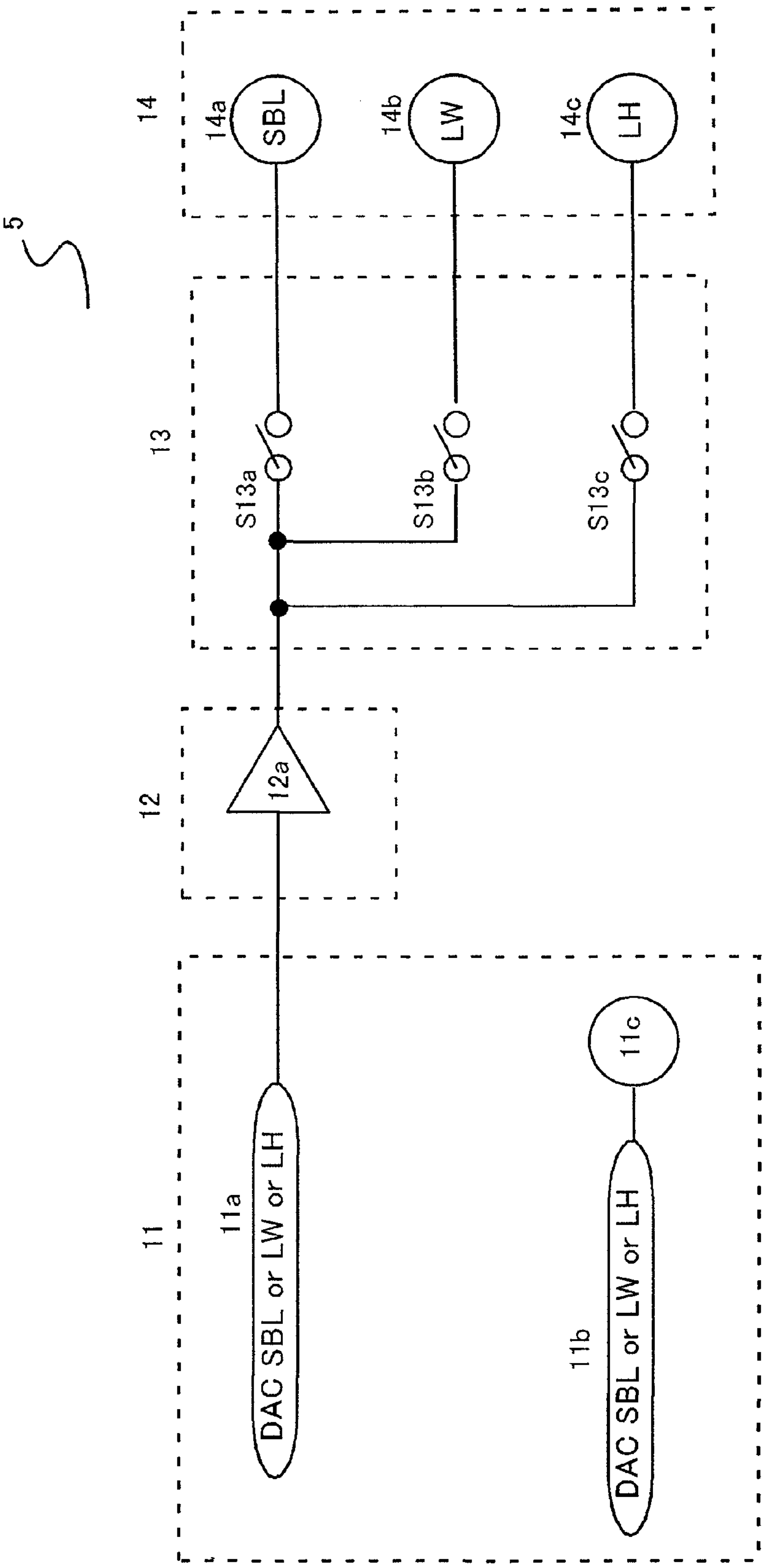
FIG. 4 is a view illustrating an audio processing unit.
Figure 5:
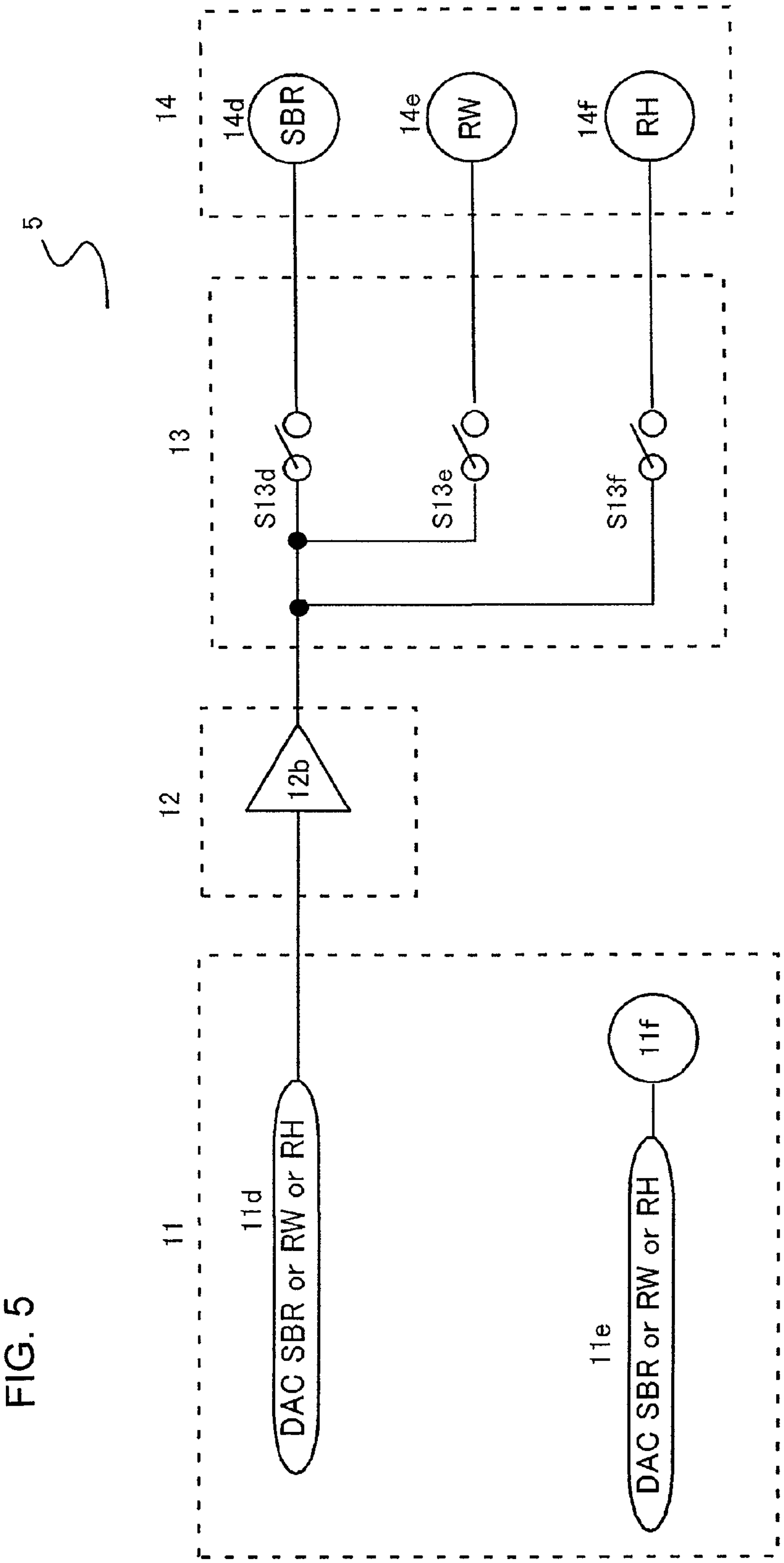
FIG. 5 is a view illustrating an audio processing unit.

FIGS. 4 and 5 are block diagrams illustrating a main part of the audio processing unit 5. FIG. 4 illustrates a configuration related to a left channel, and FIG. 5 illustrates a configuration related to a right channel. The audio processing unit 5 includes a pre-out unit 11, a power amplifier 12, an SP (speaker) relay 13, and an SP (speaker) terminal 14. In FIGS. 4 and 5, because circuits related to basic 5.1 channels (the left audio signal L, the right audio signal R, the central audio signal C, the low-frequency audio signal SW, the surround left audio signal SL, and the surround right audio signal SR) are identical to those of the related art, the circuits are omitted. A DSP provided at a front-stage of the pre-out unit 11 is also omitted.

The DSP decodes the multichannel audio data supplied from the HDMI receiver 3, and generates the audio data of each channel. The generated audio data is supplied to the pre-out unit 11.

The pre-out unit 11 includes DACs (Digital-Analog Converters) 11*a*, 11*b*, 11*d*, and 11*e*, a left pre-out terminal 11*c*, and a right pre-out terminal 11*f*. The left pre-out terminal 11*c* is connected to left pre-out input terminal of another amplifier device, and the audio signal output from the left pre-out terminal 11*c* is amplified by another amplifier device. Similarly, the right pre-out terminal 11*f* is connected to right pre-out input terminal of another amplifier device, and the audio signal output from the right pre-out terminal 11*f* is amplified by another amplifier device.

One of the surround back left audio signal SBL, the left outside audio signal LW, and the left upside audio signal LH is selectively input from the DSP to the DAC 11*a*, and the DAC 11*a* performs digital-analog conversion to the input signal. The DAC 11*a* supplies the audio signal, to which the digital-analog conversion is performed, to the amplifier 12*a*.

One of the surround back left audio signal SBL, the left outside audio signal LW, and the left upside audio signal LH is selectively input from the DSP to the DAC 11*b*, and the DAC 11*b* performs the digital-analog conversion to the input signal. The DAC 11*b* supplies the audio signal, to which the digital-analog conversion is performed, to the left pre-out terminal 11*c*.

As to the channel of the audio signal supplied from the DSP to the DAC 11*b*, one of the surround back left audio signal SBL, the left outside audio signal LW, and the left upside audio signal LH is selected by the user operation. The information on the selected channel is set and stored in a memory (not illustrated) . That is, the channel output to the left pre-out terminal 11*c* is set by the user operation. The controller 2 controls the DSP such that the audio signal of the channel stored in the memory is supplied to the DAC 11*b*.

As to the channel of the audio signal supplied from the DSP to the DAC 11*a*, in the surround back left audio signal SBL, the left outside audio signal LW, and the left upside audio signal LH, the channel included in the multichannel audio data is selected from the remaining two channels except the channel supplied to the DAC 11*b*. The controller 2 controls the DSP such that the audio signal of the selected channel is supplied to the DAC 11*a*.

One of the surround back right audio signal SBR, the right outside audio signal RW, and the right upside audio signal RH is selectively input from the DSP to the DAC 11*d*, and the DAC 11*d* performs the digital-analog conversion to the input signal. The DAC 11*d* supplies the audio signal, to which the digital-analog conversion is performed, to the amplifier 12*b*.

One of the surround back right audio signal SBR, the right outside audio signal RW, and the right upside audio signal RH is selectively input from the DSP to the DAC 11*e*, and the DAC 11*e* performs the digital-analog conversion to the input signal. The DAC 11*e* supplies the audio signal, to which the digital-analog conversion is performed, to the right pre-out terminal 11*f*.

As to the channel of the audio signal supplied from the DSP to the DAC 11*e*, one of the surround back right audio signal SBR, the right outside audio signal RW, and the right upside audio signal RH is selected by the user operation. The information on the selected channel is set and stored in the memory (not illustrated). That is, the channel output to the right pre-out terminal 11*f* is set by the user operation. The controller 2 controls the DSP such that the audio signal of the channel stored in the memory is supplied to the DAC 11*e*.

As to the channel of the audio signal supplied from the DSP to the DAC 11*d*, in the surround back right audio signal SBR, the right outside audio signal RW, and the right upside audio signal RH, the channel included in the multichannel audio data is selected from the remaining two channels except the channel supplied to the DAC 11*e*. The controller 2 controls the DSP such that the audio signal of the selected channel is supplied to the DAC 11*d*.

The power amplifier 12 includes amplifiers 12*a* and 12*b*. The amplifier 12*a* amplifies the surround back left audio signal SBL , the left outside audio signal LW, or the left upside audio signal LH, which is supplied from the DAC 11*a*, and supplies the amplified signal to the SP relay 13 (switches S13*a*, S13*b*, and S13*c*).

The amplifier 12*b* amplifies the surround back right audio signal SBR, the right outside audio signal RW, or the right upside audio signal RH, which is supplied from the DAC 11*d*, and supplies the amplified signal to the SP relay 13 (switches S13*d*, S13*e*, and S13*f*).

The SP relay 13 includes relay switches (hereinafter referred to as switches) S13*a* to S13*f*. The switch S13*a* switches whether the surround back left audio signal SBL supplied from the amplifier 12_a_ is supplied to a surround back left SP terminal 14_a_. The switch S13_b_ switches whether the left outside audio signal LW supplied from the amplifier 12_a_ is supplied to a left outside SP terminal 14_b_. The switch S13_c_ switches whether the left upside audio signal LH supplied from the amplifier 12_a_ is supplied to a left upside SP terminal 14_c_. In response to an instruction of the controller 2, the switches S13_a_ to S13_c_ are switched according to a channel setting of the pre-out terminal 11_c_ by the user operation and the channel included in the multichannel audio data.

The switch S13_d_ switches whether the surround back right audio signal SBR supplied from the amplifier 12_b_ is supplied to a surround back right SP terminal 14_d_. The switch S13_e_ switches whether the right outside audio signal RW supplied from the amplifier 12_b_ is supplied to a right outside SP terminal 14_e_. The switch S13_f_ switches whether the right upside audio signal RH supplied from the amplifier 12_b_ is supplied to the right upside SP terminal 14_f_. In response to an instruction of the controller 2, the switches S13_d_ to S13_f_ are switched according to a channel setting of the pre-out terminal 11_f_ by the user operation and the channel included in the multichannel audio data.

The SP terminal 14 includes the SP terminals 14_a_ to 14_f_. The surround back left speaker SSBL is connected to the surround back left SP terminal 14_a_. The left outside speaker SLW is connected to the left outside SP terminal 14_b_. The left upside speaker SLH is connected to the left upside SP terminal 14_c_. The surround back right speaker SSBR is connected to the surround back right SP terminal 14_d_. The right outside speaker SRW is connected to the right outside SP terminal 14_e_. The right upside speaker SRH is connected to the right upside SP terminal 14_f_.

Referring to FIG. 2, the HDMI transmitter 4 converts the video data supplied from the HDMI receiver 3 into the HDMI data, and transmits the HDMI data to the display device 200.

The controller 2 controls each unit based on an operating program of the AV amplifier, which is stored in a built-in or connected memory (not illustrated) . For example, the controller 2 is a microcomputer or a CPU and the like. According to the user operation, the controller 2 selects and sets the channels of the audio signals output to the left pre-out terminal 11_c_ and the right pre-out terminal 11_f_. The controller 2 controls the DSP such that the audio signals of the channels set by the user operation are output to the left pre-out terminal 11_c_ and the right pre-out terminal 11_f_. Generally the left pre-out terminal 11_c_ and the right pre-out terminal 11_f_ are set to the channels related to each other (a combination of the surround back left audio signal SBL and the surround back right audio signal SBR, a combination of the left outside audio signal LW and the right outside audio signal RW, or a combination of the left upside audio signal LH and the right upside audio signal RH).

The controller 2 determines which one of two channels except the channel set to the left pre-out terminal 11_c_ by the user operation in the surround back left audio signal SBL, the left outside audio signal LW, and the left upside audio signal LH is included in the multichannel audio data. The controller 2 controls the switches S13_a_ to S13_c_ based on the determination result. Similarly, the controller 2 determines which one of two channels except the channel set to the right pre-out terminal 11_f_ by the user operation in the surround back right audio signal SBR, the right outside audio signal RW, and the right upside audio signal RH is included in the multichannel audio data. The controller 2 controls the switches S13_d_ to S13_f_ based on the determination result. The multichannel audio data is not limited to the audio data received from the BD player 100, but the multichannel audio data maybe the audio data that is generated and output by the DSP.

The HDMI receiver 3 generates the original multichannel audio data from the HDMI data, and supplies the original multichannel audio data to the audio processing unit 5. The audio processing unit 5 decodes the multichannel audio data, reads channel information included in an information domain of the multichannel audio data, and supplies the channel information to the controller 2.

Figure 6:
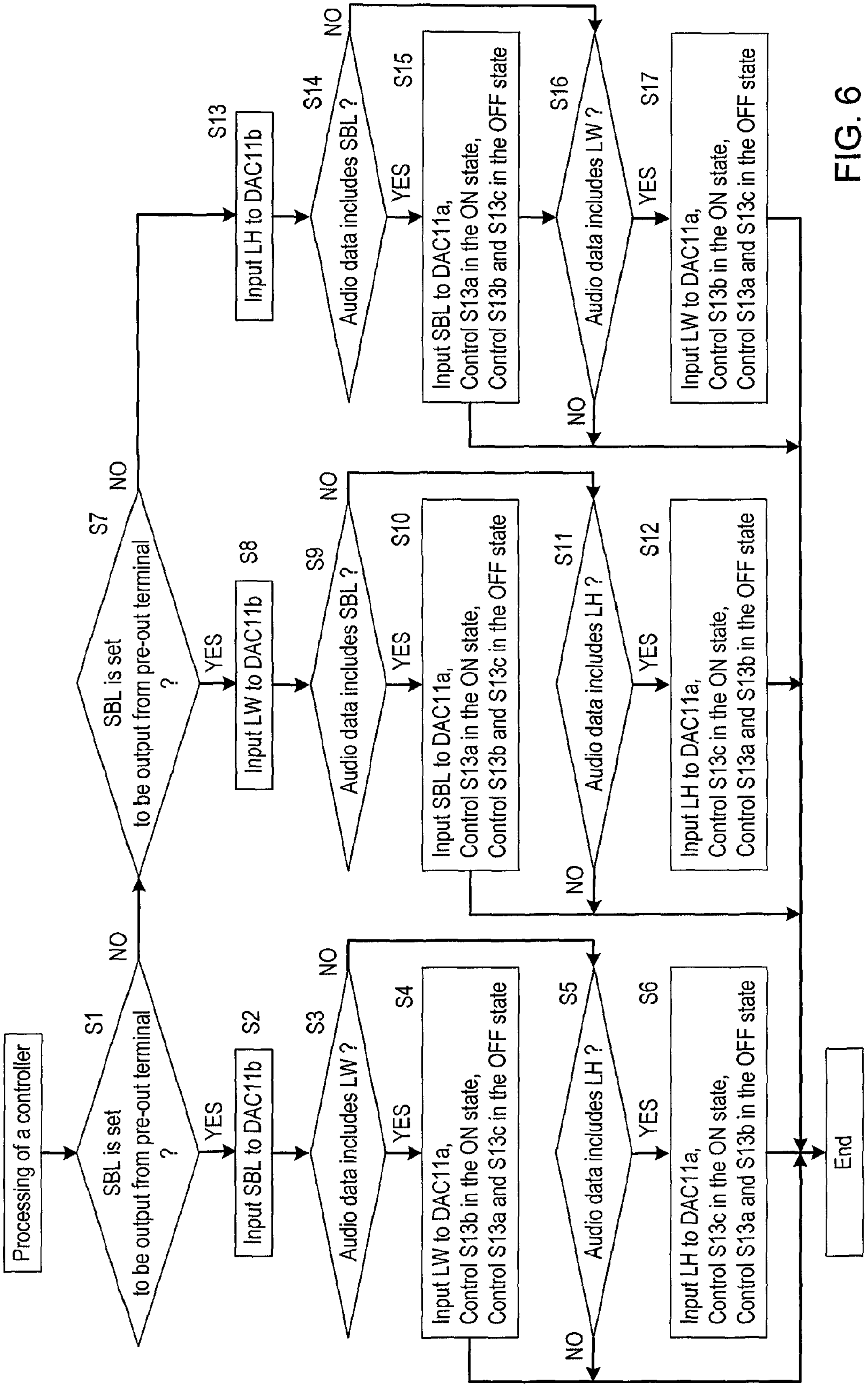
FIG. 6 is a flowchart illustrating processing of a controller.

An operation of the first embodiment will be described below. FIG. 6 is a flowchart illustrating audio switching processing of the controller 2. Although the description is made for only each left channel in the first embodiment, the same holds true for each right channel.

(The Case that Left Pre-out Terminal 11_c_ is Set to Surround Back Left Audio Signal SBL)

The controller 2 determines whether the channel of the audio signal output from the left pre-out terminal 11_c_ is set to the surround back left audio signal SBL by the user operation (S1). When the channel is set to the surround back left audio signal SBL (YES in S1), the controller 2 inputs the surround back left audio signal SBL from the DSP to the DAC 11_b_ (S2). As a result, the surround back left audio signal SBL can be output from the left pre-out terminal 11_c_.

Subsequently, the controller 2 determines whether the supplied multichannel audio data includes the left outside audio signal LW (S3). When the multichannel audio data includes the left outside audio signal LW (YES in S3), the controller 2 inputs the left outside audio signal LW from the DSP to the DAC 11_a_ (S4). The controller 2 controls the switch S13_b_ in the on state, and controls the switches S13_a_ and S13_c_ in the off state (S4). As a result, the left outside audio signal LW is amplified by the amplifier 12_a_, and output to the left outside SP terminal 14_b_ through the switch S13_b_.

On the other hand, when the multichannel audio data does not include the left outside audio signal LW (NO in S3), the controller 2 determines whether the supplied multichannel audio data includes the left upside audio signal LH (S5). When the multichannel audio data includes the left upside audio signal LH (YES in S5), the controller 2 inputs the left upside audio signal LH from the DSP to the DAC 11_a_ (S6). The controller 2 controls the switch S13_c_ in the on state, and controls the switches S13_a_ and S13_b_ in the off state (S6). As a result, the left upside audio signal LH is amplified by the amplifier 12_a_, and supplied to the left upside SP terminal 14_c_ through the switch S13_c_.

(The Case that Left Pre-out Terminal 11_c_ is Set to Left Outside Audio Signal LW)

When the channel of the audio signal output from the left pre-out terminal 11_c_ is not set to the surround back left audio signal SBL by the user operation (NO in S1), the controller 2 determines whether the channel of the audio signal output from the left pre-out terminal 11_c_ is set to the left outside audio signal LW by the user operation (S7). When the channel is set to the left outside audio signal LW (YES in S7), the controller 2 inputs the left outside audio signal LW from the DSP to the DAC 11_b_ (S8). As a result, the left outside audio signal LW can be output from the left pre-out terminal 11_c_.

The controller 2 determines whether the supplied multichannel audio data includes the surround back left audio signal SBL (S9). When the multichannel audio data includes the surround back left audio signal SBL (YES in S9), the controller 2 inputs the surround back left audio signal SBL from the DSP to the DAC 11_a_ (S10). The controller 2 controls the switch S13_a_ in the on state, and controls the switches S13_b_ and S13_c_ in the off state (S10). As a result, the surround back left audio signal SBL is amplified by the amplifier 12*a*, and supplied to the surround back left SP terminal 14*a* through the switch S13*a*.

On the other hand, when the multichannel audio data does not include the surround back left audio signal SBL (NO in S9), the controller 2 determines whether the supplied multichannel audio data includes the left upside audio signal LH (S11). When the multichannel audio data includes the left upside audio signal LH (YES in S11), the controller 2 inputs the left upside audio signal LH from the DSP to the DAC 11*a* (S12). The controller 2 controls the switch S13*c* in the on state, and controls the switches S13*a* and S13*b* in the off state (S12). As a result, the left upside audio signal LH is amplified by the amplifier 12*a*, and supplied to the left upside SP terminal 14*c* through the switch S13*c*.

(The Case that Left Pre-out Terminal 11*c* is Set to Left Upside Audio Signal LH)

When the channel of the audio signal output from the left pre-out terminal 11*c* is not set to the left outside audio signal LW by the user operation (NO in S7), the controller 2 determines that the channel of the audio signal output from the left pre-out terminal 11*c* is set to the left upside audio signal LH by the user operation. Accordingly, the controller 2 inputs the left upside audio signal LH from the DSP to the DAC 11*b* (S13). As a result, the left upside audio signal LH can be output from the left pre-out terminal 11*c*.

The controller 2 determines whether the supplied multichannel audio data includes the surround back left audio signal SBL (S14). When the multichannel audio data includes the surround back left audio signal SBL (YES in S14), the controller 2 inputs the surround back left audio signal SBL from the DSP to the DAC 11*a* (S15). The controller 2 controls the switch S13*a* in the on state, and controls the switches S13*b* and S13*c* in the off state (S15). As a result, the surround back left audio signal SBL is amplified by the amplifier 12*a*, and output to the surround back left SP terminal 14*a* through the switch S13*a*.

On the other hand, when the multichannel audio data does not include the surround back left audio signal SBL (NO in S14), the controller 2 determines whether the supplied multichannel audio data includes the left outside audio signal LW (S16). When the multichannel audio data includes the left outside audio signal LW (YES in S16), the controller 2 inputs the left outside audio signal LW from the DSP to the DAC 11*a* (S17). The controller 2 controls the switch S13*b* into the on state, and controls the switches S13*a* and S13*c* in the off state (S17). As a result, the left outside audio signal LW is amplified by the amplifier 12*a*, and output to the left outside SP terminal 14*b* through the switch S13*b*.

Through the above pieces of processing, the variation of the pre-out terminal that outputs the audio signal, which is caused by the difference of the channel information on the input signal included in the multichannel audio data supplied from the audio processing unit 5, can be prevented to always output the audio signal of the channel set by the user operation from the left pre-out terminal 11*c*.

Figure 7:
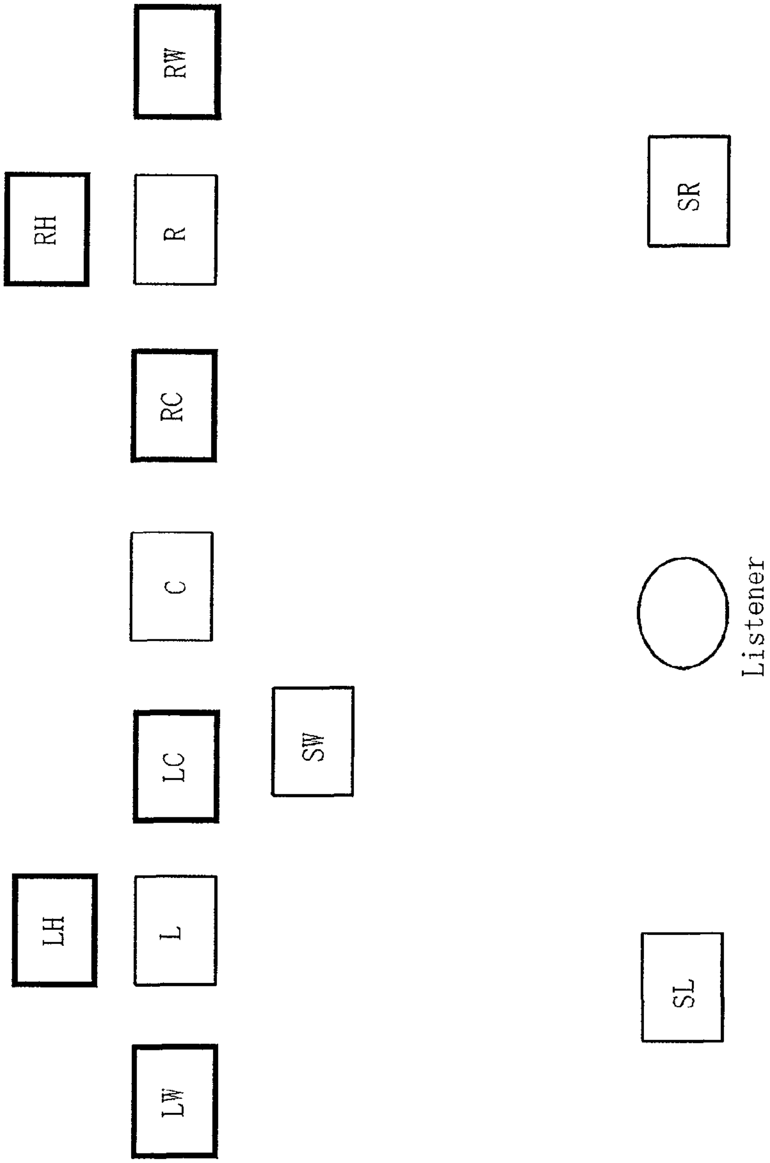
FIG. 7 is a view illustrating channels of audio signals.

A second embodiment of the present invention will be described below. As illustrated in FIG. 7, in the second embodiment, a left-central-side audio signal LC exists instead of (or in addition to) the left outside audio signal LW, and a right-central-side audio signal RC exists instead of (or in addition to) the right outside audio signal RW. The left-central-side audio signal LC is played back from a position between the left audio signal L and the central audio signal C. The right-central-side audio signal RC is played back from a position between the right audio signal R and the central audio signal C. In this case, as illustrated in FIG. 8, a circuit configuration in which the left outside audio signal LW is replaced with the left-central-side audio signal LC while the right outside audio signal RW is replaced with the right-central-side audio signal RC may be used.

Figure 8:
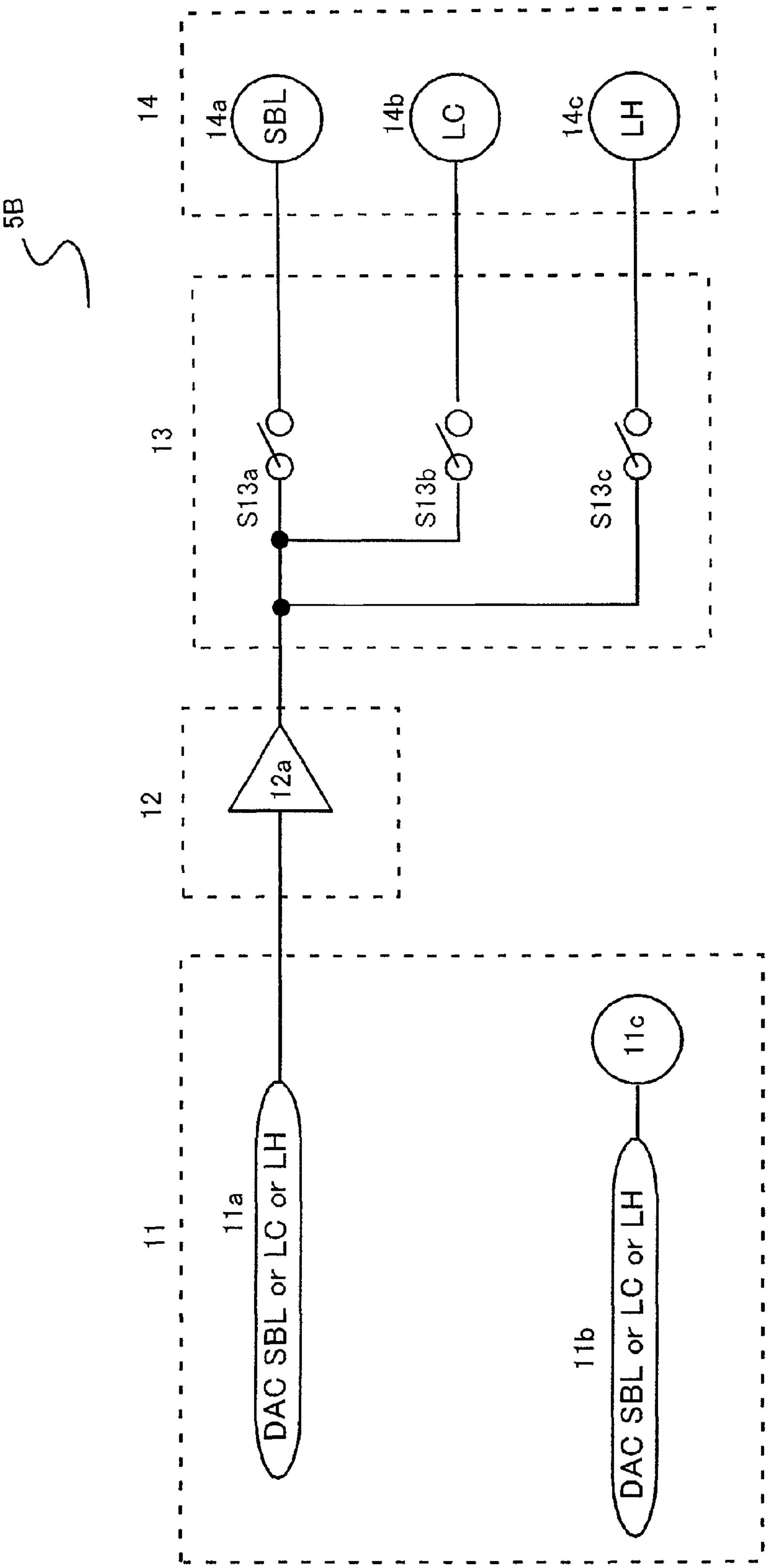
FIG. 8 is a view illustrating the audio processing unit.
Figure 9:
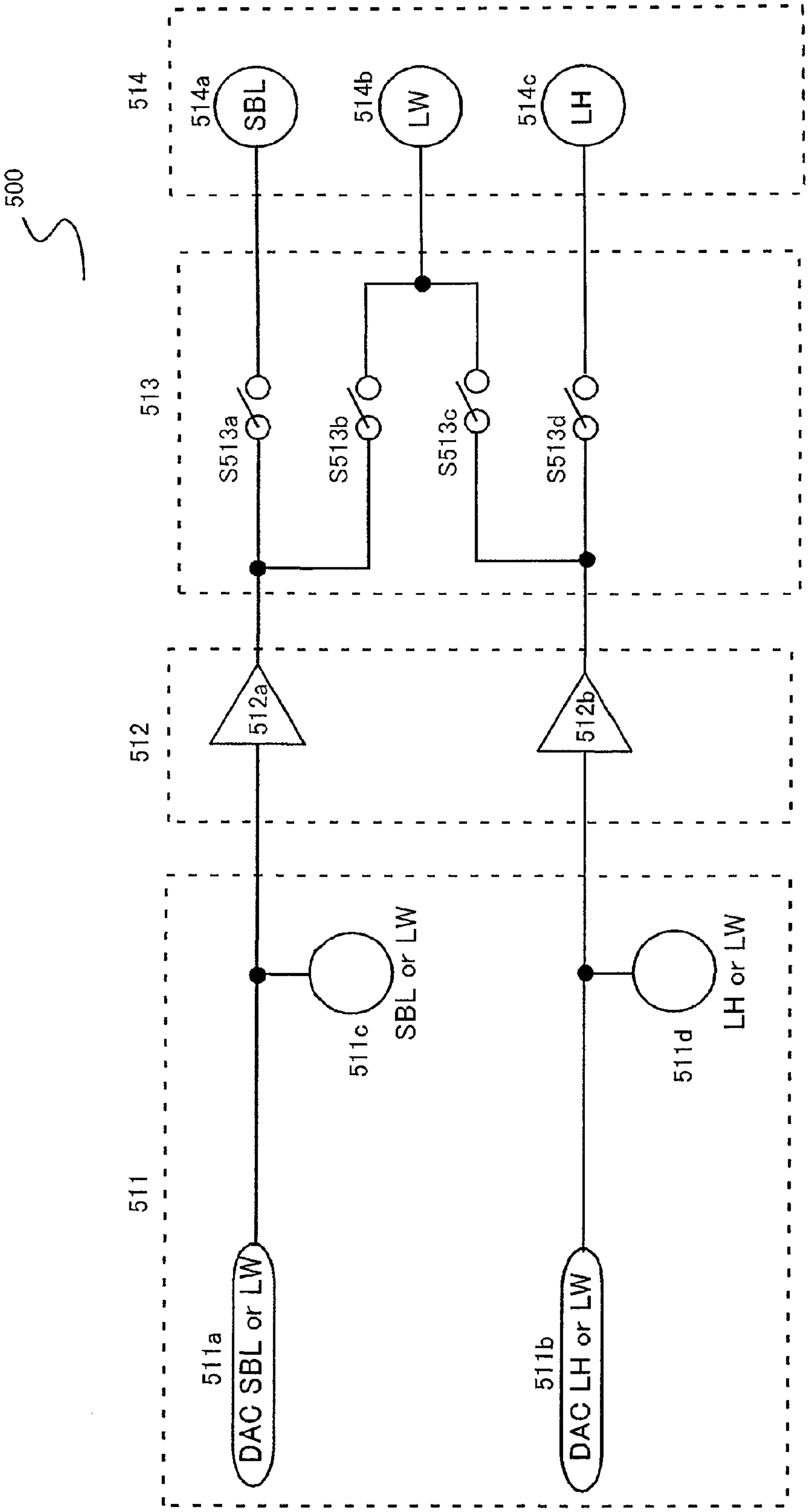
FIG. 9 is a view illustrating an audio processing unit of the related art.

When the second embodiment is generally expressed in consideration of the circuit configuration in FIG. 8, the surround back left audio signal SBL is defined as a first extended left audio signal, the surround back right audio signal SBR is defined as a first extended right audio signal, the left outside audio signal LW is defined as a second extended left audio signal, the right outside audio signal RW is defined as a second extended right audio signal, the left upside audio signal LH is defined as a third extended left audio signal, and the right upside audio signal RH is defined as a third extended right audio signal.

The first extended left audio signal may be any one of the surround back left audio signal SBL, the left outside audio signal LW, the left upside audio signal LH, and the left-central-side audio signal LC. The second extended left audio signal may be anyone of the surround back left audio signal SBL, the left outside audio signal LW, the left upside audio signal LH, and the left-central-side audio signal LC, and the channel of the second extended left audio signal maybe different from that of the first extended left audio signal. The third extended left audio signal may be any one of the surround back left audio signal SBL, the left outside audio signal LW, the left upside audio signal LH, and the left-central-side audio signal LC, and the channel of the third extended left audio signal may be different from that of each of the first extended left audio signal and the second extended left audio signal.

Similarly the first extended right audio signal may be any one of the surround back right audio signal SBR, the right outside audio signal RW, the right upside audio signal RH, and the right-central-side audio signal RC. The second extended right audio signal may be any one of the surround back right audio signal SBR, the right outside audio signal RW, the right upside audio signal RH, and the right-central-side audio signal RC, and the channel of the second extended right audio signal may be different from that of the first extended right audio signal. The third extended right audio signal may be any one of the surround back right audio signal SBR, the right outside audio signal RW, the right upside audio signal RH, and the right-central-side audio signal RC, and the channel of the third extended right audio signal may be different from that of each of the first extended left audio signal and the second extended left audio signal.

The embodiments of the present invention are described above, the present invention is not limited to the embodiments. A program that makes a computer to execute the operation of the AV amplifier and a recording medium in which the program is recorded may be provided.

The present invention is suitably applied to the AV amplifier and the like.

What is claimed is:

1. An audio processing apparatus comprising:

an amplifier that amplifies a first extended audio signal, a second extended audio signal, or a third extended audio signal, the first extended audio signal being a first extended left audio signal or a first extended right audio signal, the second extended audio signal being a second extended left audio signal or a second extended right audio signal, and the third extended audio signal being a third extended left audio signal or a third extended right audio signal;

a first speaker terminal that outputs the first extended audio signal;

a second speaker terminal that outputs the second extended audio signal;

a third speaker terminal that outputs the third extended audio signal;

a pre-out terminal that outputs one of the first extended audio signal, the second extended audio signal, and the third extended audio signal, which are set by a pre-out setting unit;

a first switch that switches whether the first extended audio signal is supplied from the amplifier to the first speaker terminal;

a second switch that switches whether the second extended audio signal is supplied from the amplifier to the second speaker terminal;

a third switch that switches whether the third extended audio signal is supplied from the amplifier to the third speaker terminal;

the pre-out setting unit that selects and sets one of the first extended audio signal, the second extended audio signal, and the third extended audio signal by a user operation, and outputs the selected audio signal to the pre-out terminal; and a controller that determines which one of two audio signals except the audio signal set by the pre-out setting unit in the first extended audio signal, the second extended audio signal, and the third extended audio signal is included in multichannel audio data; and that causes the first switch to supply the first extended audio signal amplified by the amplifier to the first speaker terminal when determining that the first extended audio signal is included in the multichannel audio data, the controller causing the second switch to supply the second extended audio signal amplified by the amplifier to the second speaker terminal when determining that the second extended audio signal is included in the multichannel audio data, the controller causing the third switch to supply the third extended audio signal amplified by the amplifier to the third speaker terminal when determining that the third extended audio signal is included in the multichannel audio data.

2. The audio processing apparatus according to claim 1, wherein the first extended left audio signal is any one of a surround back left audio signal, a left outside audio signal, a left upside audio signal, and a left-central-side audio signal, the first extended right audio signal is any one of a surround back right audio signal, a right outside audio signal, a right upside audio signal, and a right-central-side audio signal, the second extended left audio signal is any one of the surround back left audio signal, the left outside audio signal, the left upside audio signal, and the left-central-side audio signal and is different from the first extended left audio signal, the second extended right audio signal is any one of the surround back right audio signal, the right outside audio signal, the right upside audio signal, and the right-central-side audio signal and different from the first extended right audio signal, the third extended left audio signal is any one of the surround back left audio signal, the left outside audio signal, the left upside audio signal, and the left-central-side audio signal and different from the first extended left audio signal 34 and the second extended left audio signal, and the third extended right audio signal is any one of the surround back right audio signal, the right outside audio signal, the right upside audio signal, and the right-central-side audio signal and different from the first extended right audio signal and the second extended right audio signal.

* * * * *